United States Patent [19]

Ryan

[11] Patent Number: 5,422,721
[45] Date of Patent: Jun. 6, 1995

[54] FOURIER TRANSFORM SPECTROSCOPY BY VARYING THE PATH LENGTH DIFFERENCE BETWEEN THE PATHS IN EACH OF A PLURALITY OF PAIRS OF OPTICAL PATHS

[75] Inventor: Robert E. Ryan, Levittown, N.Y.

[73] Assignee: Northrop Grumman Corporation, Los Angeles, Calif.

[21] Appl. No.: 226,286

[22] Filed: Apr. 11, 1994

[51] Int. Cl.⁶ .............................................. G01B 9/02
[52] U.S. Cl. ........................................ 356/345; 356/346
[58] Field of Search ............................... 356/346, 345

[56] References Cited

U.S. PATENT DOCUMENTS

| 4,596,466 | 6/1986 | Ulrich | 356/346 |
| 5,321,501 | 6/1994 | Swanson et al. | 356/345 |

FOREIGN PATENT DOCUMENTS

| 58-100722 | 6/1983 | Japan | 356/346 |
| 1126503 | 5/1989 | Japan | 356/345 |

OTHER PUBLICATIONS

BJ Lin et al. "Interferometric Complex Filter" IBM Tech. Disclosure vol. 16, No. 8, Jan. 1974, pp. 2587–2589.

*Primary Examiner*—Samuel A. Turner
*Assistant Examiner*—Jason D. Eisenberg
*Attorney, Agent, or Firm*—Terry J. Anderson

[57] ABSTRACT

A Fourier-transform spectrometer includes a plurality of detectors (118-1 through 118-L), each of which receives light from a pair of optical paths of different optical path lengths. A movable mirror (116) varies the difference between the path lengths of each pair. Analog-to-digital converters (124-1 through 124-L) sample the resultant outputs at regular distance-difference intervals so as to generate sequences of sample values. The distance-difference ranges for the pairs of paths associated with different detectors are different, and the sequences together make up a synthetic interferogram that covers a range of distance differences 2L times the range of motion of the movable mirror (116). A Fourier transformation circuit (126) computes the Fourier transform of the synthetic interferogram, thereby determining the power spectrum of the incoming light, and operates a display (128) to indicate the result.

4 Claims, 1 Drawing Sheet

FOURIER TRANSFORM SPECTROSCOPY BY VARYING THE PATH LENGTH DIFFERENCE BETWEEN THE PATHS IN EACH OF A PLURALITY OF PAIRS OF OPTICAL PATHS

BACKGROUND OF THE INVENTION

The present invention concerns multiplex, or Fourier-transform, spectroscopy.

Fourier-transform spectroscopy is a way of adapting to light a Fourier-analysis technique commonly employed to determine the spectral content of an electrical signal. In accordance with the technique employed for electrical signals, the instantaneous value of the signal is repeatedly sampled at a rate at least twice the signal bandwidth, and the spectral content of the sampled signal is determined by performing a discrete Fourier transformation:

$$F(n) = \sum_{k=0}^{N-1} u(k) e^{\frac{-j2\pi nk}{N}} \quad (1)$$

where u(k) is the value of the kth sample of the electrical signal and F(n) is the (complex) value of the nth spectral component.

A straightforward adaptation of this approach to light is not practical, because the electric field associated with visible light, for instance, is on the order of $10^{15}$ Hz, which dictates too short a sampling window for conventional sampling techniques. Moreover, even if short enough sampling windows were possible, it would be quite difficult to achieve the sampling rates that would be required for any meaningful bandwidth.

Fourier-transform spectrometers, also called multiplex spectrometers, overcome this difficulty by taking advantage of a special case of Parseval's theorem:

$$F\left\{ \int_{-\infty}^{+\infty} u(\tau) u(\tau - t) d\tau \right\} = |F\{u(t)\}|^2. \quad (2)$$

That is, if successive values of the autocorrelation of the incoming light can be determined, the power spectrum can be computed by taking the Fourier transform of the autocorrelation function.

FIG. 1 depicts a conventional Fourier-transform spectrometer, which makes such a determination. Incoming light, depicted in FIG. 1 as being produced by a point source 10 and transformed into a plane wave by a collimating lens 12, is divided by a beam splitter 14 between two paths. In the first path, to which the beam splitter 14 directs light by reflection, a first mirror 16 reflects light through the beam splitter to a detector 18. A focusing lens 20 typically concentrates the light onto the detector. In the second path, to which the beam splitter directs light by transmission, a second mirror 22 reflects the light to the beam splitter 14, which reflects it through the focusing lens 20 to the detector 18. In other words, the common detector 18 receives light from both paths.

We will assume that the difference between the optical lengths of the two paths is Δd. Accordingly, if Au(t) is the scalar representation of the field disturbance contributed by one path, the total field disturbance at the detector can be given by:

$$Au(t) + Bu\left(t - \frac{\Delta d}{c}\right), \quad (3)$$

where c is the speed of light in a vacuum. The difference Δd is thus the difference between optical distances defined by the integrals of refractive index over the respective paths. This arrangement can produce an autocorrelation value because photodetectors respond to intensity rather than instantaneous field strength. That is, the photodetector 18 responds to the mean value of the square of the field-strength value given by equation (3), i.e., to the mean value of the following expression:

$$A^2 u^2(t) + B^2 u^2\left(t - \frac{\Delta d}{c}\right) + 2ABu(t)u\left(t - \frac{\Delta d}{c}\right). \quad (4)$$

The mean values of the first two terms in expression (4) are the intensities that would result from the respective paths individually, while the mean value of the third term will be recognized as being proportional to the autocorrelation, evaluated at Δd/c, of the two field values.

A Fourier-transform spectrometer varies the distance Δd between the optical path lengths. Scanning mechanisms for optical distance variations can take many forms. One type, for instance, varies the pressure of a gas in the optical paths and thus varies the refractive index. Other types translate refractive wedges or pivot refractive slabs in one of the paths. FIG. 1 depicts yet another type, which comprises a drive mechanism 23 for moving one of the mirrors 16. The result of the path-difference variation is that the detector output as a function of time represents the sum of the individual intensities and the autocorrelation evaluated throughout a range of delays, and the Fourier-transform spectrometer obtains the spectrum by determining the Fourier transform of the (necessarily truncated) autocorrelation functions.

FIG. 1 depicts a typical device for performing the transformation digitally, although analog devices, such as compressive receivers, have also been proposed for performing the transformation. At equally spaced values of optical-distance difference, an analog-to-digital converter 24 is triggered to sample the output of the photodetector 18 and generate digital signals indicative of the sampled value. A typical way of achieving this equal-spaced triggering is to cause the output of an auxiliary HeNe or other stable gas laser (not shown) to propagate through the two interferometer paths to, say, a silicon photodiode whose output is fed to a Schmitt trigger, which triggers the analog-to-digital converter 24. Computation circuitry 26 performs a discrete Fourier transformation of the resulting "interferogram," and it employs an appropriate display mechanism 28 to present the thereby-determined spectrum to the user.

Since the intensities for the individual paths are not affected by the change in optical distance, the contribution to the photodetector output from the first two terms in equation (4) are the same in all of the samples taken by the analog-to-digital converter 24. It is only the third terms that is dependent on optical-path distance. As a result, the first term affects only the "zero-frequency" output of the Fourier-transformation process, so all of the remaining output terms represent the Fourier transform of the autocorrelation of the field-strength signal. As equation (2) indicates, these values are thus the squares of the absolute values of the corresponding terms in the Fourier transform of the field signal itself; that is, they represent the power spectrum of the received light. The spectral resolution is inversely proportional to the length of the scan, as it is in any correlation spectral determination method.

A review of the foregoing explanation reveals that the Fourier-transform spectrometer operates by converting the problem of sampling a signal at an impossibly high temporal frequency into that of sampling it at corresponding achievable spatial intervals. The required spatial frequency of sampling is determined by the spatial bandwidth of the incoming light in accordance with Shannon's sampling theorem: the sampling must occur at a spatial frequency at least twice the spatial bandwidth of the received light. For instance, if the received light is restricted to wavenumbers between 1000 cm$^{-1}$ and 5000 cm$^{-1}$, the sampling frequency must exceed one sample/micron (10,000 samples/cm) in order to avoid aliasing. The Fourier-transform spectrometer is practical because, unlike sampling at the corresponding temporal frequency, sampling at this spatial frequency is readily performed by employing mechanisms such as the auxiliary HeNe laser to provide the required sampling accuracy.

Unfortunately, although the desired positioning accuracy can readily be achieved through a limited range with linear drives, the scan time and physical volume of the interferometer tend to increase with scan length, and relatively large scan distances are necessary if fine wavelength resolution is to be obtained. For instance, in order to achieve a wavelength resolution of 1 cm$^{-1}$ "unapodized," i.e., without a window function, the mirror needs to move 0.5 cm. And the required travel increases with the stringency of the resolution requirement. The expense of the drive increases disproportionately with the distance requirement, and for fine-resolution devices it can become a significant factor in the overall cost of the spectrometer. It would therefore be desirable to obtain greater resolution without the need for excessive mirror travel. This would also increase the rate at which spectra can be obtained in high-signal-to-noise cases.

SUMMARY OF THE INVENTION

The present invention achieves this result by lengthening the effective range of the autocorrelation without lengthening the travel of the mirror or other path-length-varying element. Rather than varying the optical-path-length difference between only a single pair of paths, a spectrometer employing the teachings of the present invention varies the path-length difference between the paths in each of a plurality of pairs of optical paths. The range of path-length differences in each pair is relatively small, but the path-length differences in each pair vary through different ranges, which together make up a relatively wide range. The samples from all of the pairs make up a synthetic interferogram whose delay range is a multiple of that of the individual interferogram from any single path pair, and the spectrometer determines the Fourier transform of this synthetic interferogram. Not only does such an arrangement increase the resolution obtainable with a given mirror travel, but it also has the potential for multiplying the speed with which the spectral measurement is performed.

BRIEF DESCRIPTION OF THE DRAWINGS

These and further features and advantages of the present invention are described in connection with the accompanying drawings, in which.

DETAILED DESCRIPTION OF AN ILLUSTRATIVE EMBODIMENT

Figure 2:
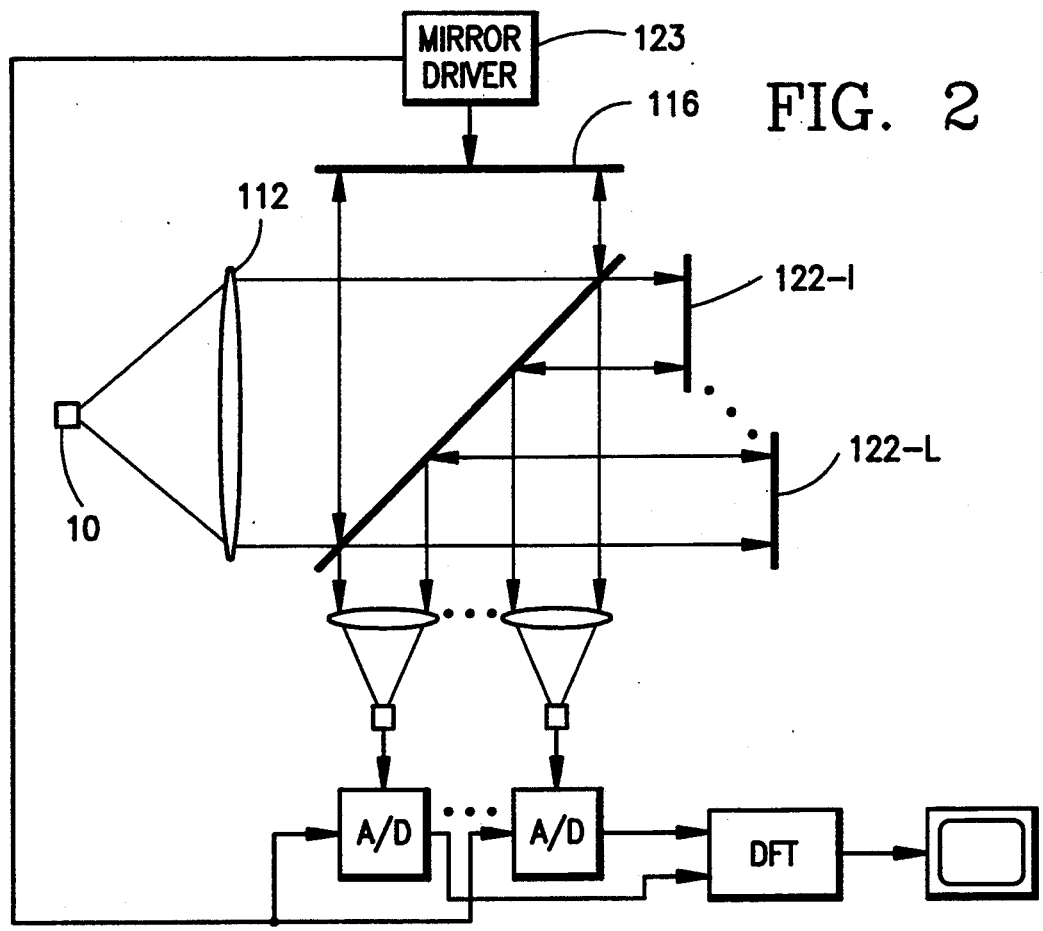
FIG. 2 is a block diagram of a Fourier-transform spectrometer that employs the teachings of the present invention.

FIG. 2 depicts a Fourier-transform spectrometer that directs the received light through a plurality of optical-path pairs simultaneously and that simultaneously varies the distance differences in those path pairs. By sampling the recombined light from each path pair, the spectrometer generates a plurality of different interferograms. It determines the light spectrum by Fourier transformation of the composite interferogram that results from combining the individual interferograms, and it thereby greatly improves the wavelength resolution over that which would result from a single interferogram produced by the same mirror travel.

Figure 1:
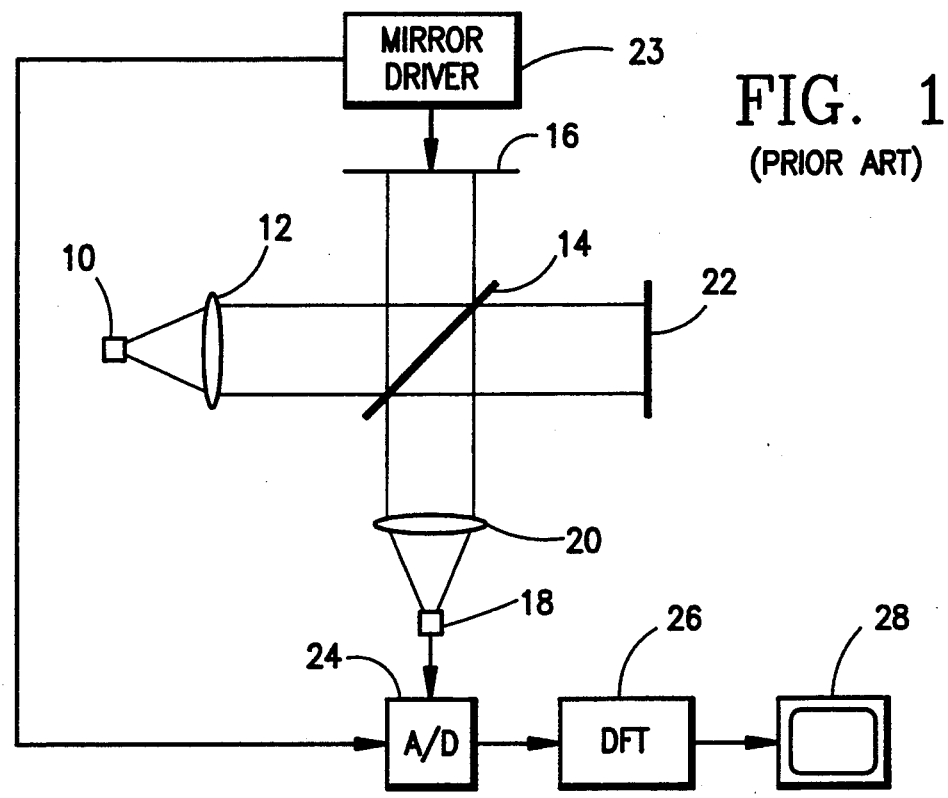
FIG. 1 is a block diagram of a prior-art Fourier-transform spectrometer.

Reference numerals for elements in FIG. 2 differ from those for corresponding elements in FIG. 1 by 100; e.g., source 110 in FIG. 2 corresponds to source 10 in FIG. 1. Except for differences that will be described below, the functions of elements in FIG. 2 are largely similar to those of the corresponding elements in FIG. 1.

The most-apparent difference between the spectrometer of FIGS. 1 and 2 is that the FIG. 2 device includes L mirrors 122-1 through 122-L in place of the single mirror 22 of FIG. 1. For each of the L mirrors 122, the spectrometer of FIG. 2 also includes a separate focusing mirror 120, detector 118, and analog-to-digital converter 124. Like detector 18 of FIG. 1, each of the detectors 118-1 through 119-L receives light that reaches it through a pair of different-optical-length paths, and movement of mirror 116 under the control of mirror driver 122 changes the difference in length between the pair of paths by which the light reaches each detector 118.

In the illustrated embodiment, the mirror driver 122 triggers all of the analog-to-digital converters 124-1 through 124-L simultaneously, so the distance-difference changes represented by successive samples are the same for all of the sampling channels. But the mirrors 122-1 through 122-L are all disposed at different optical distances from the collimating lens 112, so the distance-difference ranges represented by the sample sequences from each of the analog-to-digital converters 124-1 through 124-L differ. Preferably, the difference between the ranges associated with successive ones of the mirrors 122-1 through 122-L equals the number of samples per sequence divided by the spatial sampling frequency. With such an arrangement, the distance-difference intervals are contiguous, and the computation circuit 126 can simply concatenate the sample sequences from the successive light-path pairs to obtain a composite sequence of which it can compute the discrete Fourier transformation. That is, if u(l, m) is the mth sample from the lth analog-to-digital converter 124-l, the discrete Fourier transformation given by equation (1) for such an arrangement becomes:

$$F(n) = \sum_{l=1}^{L} \sum_{m=1}^{M} u(l,m) e^{-j2\pi n \frac{m-1+(l-1)M}{LM}} \quad (5)$$

The resulting LM distinct values of F(n) represent values of the power spectrum taken at wavelengths whose wave numbers occur at intervals of 1/(2Ld), where d is the mirror travel. In practice, the values of equation (5) may be adjusted in any one of the conventional ways to reduce the effects of the finite autocorrelation record and the inevitable misalignment of the sampling function with the zero-delay point in the interferogram.

Equation (5) shows that the arrangement of FIG. 2 results in performance that is nearly L times as good as that which results from the arrangement of FIG. 1; in order to obtain LM spectral values, the conventional arrangement depicted in FIG. 1 would require that samples be taken at LM mirror positions, while that of FIG. 2 requires taking samples at only M mirror positions. Thus, the arrangement of FIG. 2 can be made considerably faster for the same number of spectral values. Additionally, the spectral resolution (in wave number) of the FIG. 1 arrangement for a mirror travel d is simply 1/(2d) rather than the 1/(2Ld) of the system of FIG. 2. For instance, in a spectrometer in which the desired resolution is 1 cm$^{-1}$, the required mirror travel in a conventional Fourier-transform spectrometer is necessarily 0.5 cm, whereas the required travel in an embodiment of the present invention that employs four paths is only 0.125 cm. This decreased path typically results in a more reliable and rugged system.

As was suggested above, combining the outputs of the various sequences in order to obtain a meaningful Fourier transformation imposes certain constraints on their relationships. Ideally, the difference between successive distance ranges should be equal to the number of samples in an individual sequence divided by the spatial sampling frequency. This makes the ranges form a regular sampling interval without overlapping. In principle, the ranges could be allowed to overlap, and redundant samples would then either be discarded or averaged with the corresponding sample from a different channel, but such an approach is somewhat less efficient.

Additionally, the samples should be normalized for detector sensitivity, attenuation difference, etc. This can readily be achieved through a calibration process in which each detector produces an output in response to each of its paths individually; in operation, the output of each detector would then be divided by the geometric mean of its two calibration results.

To obtain an accurate Fourier transformation, the spatial sampling windows must be positioned within a tolerance that is small with respect to the shortest wavelength in the band being monitored. For infrared light, this means an accuracy on the order of half a micron. If, as is preferable, all analog-to-digital converters are to be triggered from the same signal, this will in most cases require that mirrors 122-1 through 122-L be positioned with respect to each other with similar accuracy. However, those skilled in the art are familiar with techniques for achieving such accuracy. After an initial, relatively rough positioning, for instance, further accuracy can be achieved by using a pair of auxiliary lasers of slightly different wavelengths in respective circuits similar to the trigger circuit described above. The zero crossings of one circuit would be used as a vernier, while the phase difference between the occurrences of the two circuits' zero crossings would give a coarser indication of path-length difference between spatial sampling windows. Other position methods could also be employed.

Clearly, the invention can be embodied in a wide range of devices that differ from the one depicted in the drawings. For instance, any of the other conventional ways of varying path-length difference can be employed. Additionally, although mirrors 122 are shown as being staggered so as to result in differing physical path differences, the differences in optical path lengths can alternatively be achieved by coplanar mirrors 122 preceded by refractive-material slabs of different thicknesses so as to produce different optical lengths in the same physical lengths.

Furthermore, although I believe that employing a common mirror 116 and a common mirror driver 122 yields significant advantages, the broader principles of the present invention can be embodied in an arrangement that uses a separate driver and mirror for each channel. Such a system would still have the speed potential of the present invention, although its advantages in expense and reliability would be compromised to some extent by the use of multiple drive mechanisms.

It is accordingly apparent that the present invention can be embodied in a wide range of apparatus and that it thus constitutes a significant advance in the art.

What is claimed is:

1. For determining spectral content of received light, a Fourier-transform spectrometer comprising:
    collimating means for collimating the received light:
    a beam splitter for dividing the collimated light into a plurality of pairs of optical paths, each pair including a first path and a second path, a first path in each pair leading to a common scanning mechanism for varying the optical-distance difference of each path pair through a different range by simultaneously varying a length of the first path in each pair during scanning:
    a length determining means in the second path of each of said pairs for determining the length of each said second path, said second path length determining means being disposed at different optical distances from the collimating means;
    a light detector for measuring an intensity of the recombined light from each pair of paths throughout its respective range of optical-distance differences so as to generate an interferogram associated with each pair of paths; and
    a Fourier-transform circuit for determining the Fourier transform of a synthetic interferogram formed by combining the interferograms associated with the pairs of paths and for generating therefrom output signals representative of the spectral content of the received light.

2. A spectrometer as claimed in claim 1, wherein the collimating means is a collimating lens positioned between a source of said received light and the beam splitter, and wherein the path length determining means comprises a plurality of mirrors, one of which is provided for each of said pairs, each mirror being positioned in the second path and spaced at a different distance from the collimating lens.

3. A spectrometer as claimed in claim 2, wherein the scanning mechanism comprises a common mirror and common mirror driver.

4. For determining spectral content of received light, a method comprising the steps of:
- dividing the received light into a plurality of pairs of optical paths, each pair including a first path and a second path, a first path in each pair leading to a common scanning mechanism;
- disposing length determining means in the second path of each of said pairs for determining the length of each said second path, said second path length determining means being disposed at different optical distances from the collimating means;
- varying the optical-distance difference of each path pair through a different range by simultaneous varying a length of the first path by moving the common scanning mechanism; and
- measuring an intensity of the recombined light from each pair of paths throughout its respective range of optical-distance differences so as to generate an interferogram associated with each pair of paths;
- determining a Fourier transform of a synthetic interferogram formed by combining the interferograms associated with the pairs of paths; and
- generating a signal representative of the spectral content indicated by the Fourier transform.

* * * * *